United States Patent
Abhishek et al.

(10) Patent No.: US 9,697,065 B1
(45) Date of Patent: Jul. 4, 2017

(54) SYSTEMS AND METHODS FOR MANAGING RESET

(71) Applicant: FREESCALE SEMICONDUCTOR, INC., Austin, TX (US)

(72) Inventors: Kumar Abhishek, Austin, TX (US); Steven K. Watkins, Austin, TX (US); Garima Sharda, Ghaziabad (IN); James M. Giandelone, Austin, TX (US); Stefano Pietri, Austin, TX (US); Thomas H. Luedeke, Oberbergkirchen (DE)

(73) Assignee: NXP USA, Inc., Austin, TX (US)

( * ) Notice: Subject to any disclaimer, the term of this patent is extended or adjusted under 35 U.S.C. 154(b) by 9 days.

(21) Appl. No.: 15/064,641

(22) Filed: Mar. 9, 2016

(51) Int. Cl.
*G06F 11/00* (2006.01)
*G06F 11/07* (2006.01)

(52) U.S. Cl.
CPC ...... *G06F 11/0757* (2013.01); *G06F 11/0745* (2013.01)

(58) Field of Classification Search
USPC .......................................................... 714/55
See application file for complete search history.

(56) References Cited

U.S. PATENT DOCUMENTS

| | | | |
|---|---|---|---|
| 4,803,682 A | 2/1989 | Hara et al. | |
| 5,019,717 A | 5/1991 | McCurry et al. | |
| 5,073,853 A | 12/1991 | Johnson | |
| 5,214,560 A | 5/1993 | Jensen | |
| 5,440,603 A | 8/1995 | Sugita | |
| 5,638,510 A | 6/1997 | Ishikawa | |
| 5,652,836 A | 7/1997 | Park | |
| 6,212,134 B1 | 4/2001 | Yamashita | |
| 6,378,083 B1 | 4/2002 | Yamanaka et al. | |
| 6,813,672 B1 * | 11/2004 | Kamran | H04L 25/085 370/463 |
| 2009/0045916 A1 * | 2/2009 | Nitzan | G06K 19/0723 340/10.1 |
| 2010/0299563 A1 * | 11/2010 | Stachler | H01R 13/6456 714/39 |
| 2012/0218012 A1 | 8/2012 | Nix et al. | |

* cited by examiner

*Primary Examiner* — Sarai Butler

(57) ABSTRACT

A method for managing a reset process in a processing system is provided. The method includes enabling a watch dog unit based on a power-on reset (POR) event. A stuck in reset condition indication is received at the watch dog unit and used to determine whether the received reset condition indication corresponds to an unintentional reset condition. If the received reset condition indication is an indication of an unintentional reset condition, a watch dog POR trigger signal is generated and a reset state machine is repeated for system recovery.

20 Claims, 3 Drawing Sheets

SYSTEMS AND METHODS FOR MANAGING RESET

FIELD OF THE DISCLOSURE

This disclosure generally relates to data processing, and more particularly to systems and methods for managing reset in a processing system.

BACKGROUND

In the field of the embedded applications, correct behavior of a microcontroller typically depends, inter alia, upon a timely response to an external stimulus. Indeed, failure by the microcontroller to respond to an event within an expected time frame can result in serious malfunction of a system that is under the control of the microcontroller. In this respect, response time of the microcontroller is dependent upon hardware and software design and can be an extremely complex value to predict.

Hence, for some embedded applications, a maximum time limit is typically attributed to a given external stimulus, and failure by the microcontroller in some circumstances to respond to the given external stimulus within the maximum time limit results in incorrect performance of the system. In such circumstances, it is desirable to place the microcontroller in a known "safe" state. In other circumstances, failure by the microcontroller to respond to the external stimulus within the maximum time limit can result in the external stimulus becoming invalid after expiration of the maximum time limit. Consequently, providing a response to the external stimulus that is no longer valid can also cause the system to behave incorrectly, for example, becoming stuck in reset.

In order to overcome such problems described above, it is known to design microcontrollers with watch dog functions or elaborate other defensive measures to detect and report timeout events. Once a timeout event is detected, corrective action can be taken to avoid incorrect performance of the system.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Embodiments of data processing systems and methods are disclosed that provide a power on reset watch dog that monitors various signals in a processing system to distinguish between staying in system reset intentionally and unintentionally. The watch dog runs using a clock signal that is independent of a boot or system clock signal. The watch dog is enabled as soon as an analog power management controller power-on reset is released. A RESET pad Output Buffer Enable control signal is monitored to detect whether RESET is being held by an on-chip reset controller or by an external component. The reset controller can generate a signal to indicate when staying in reset is a valid condition, such as when reset is generated due to a combination of factors, or an external component is requesting reset.

Figure 1:
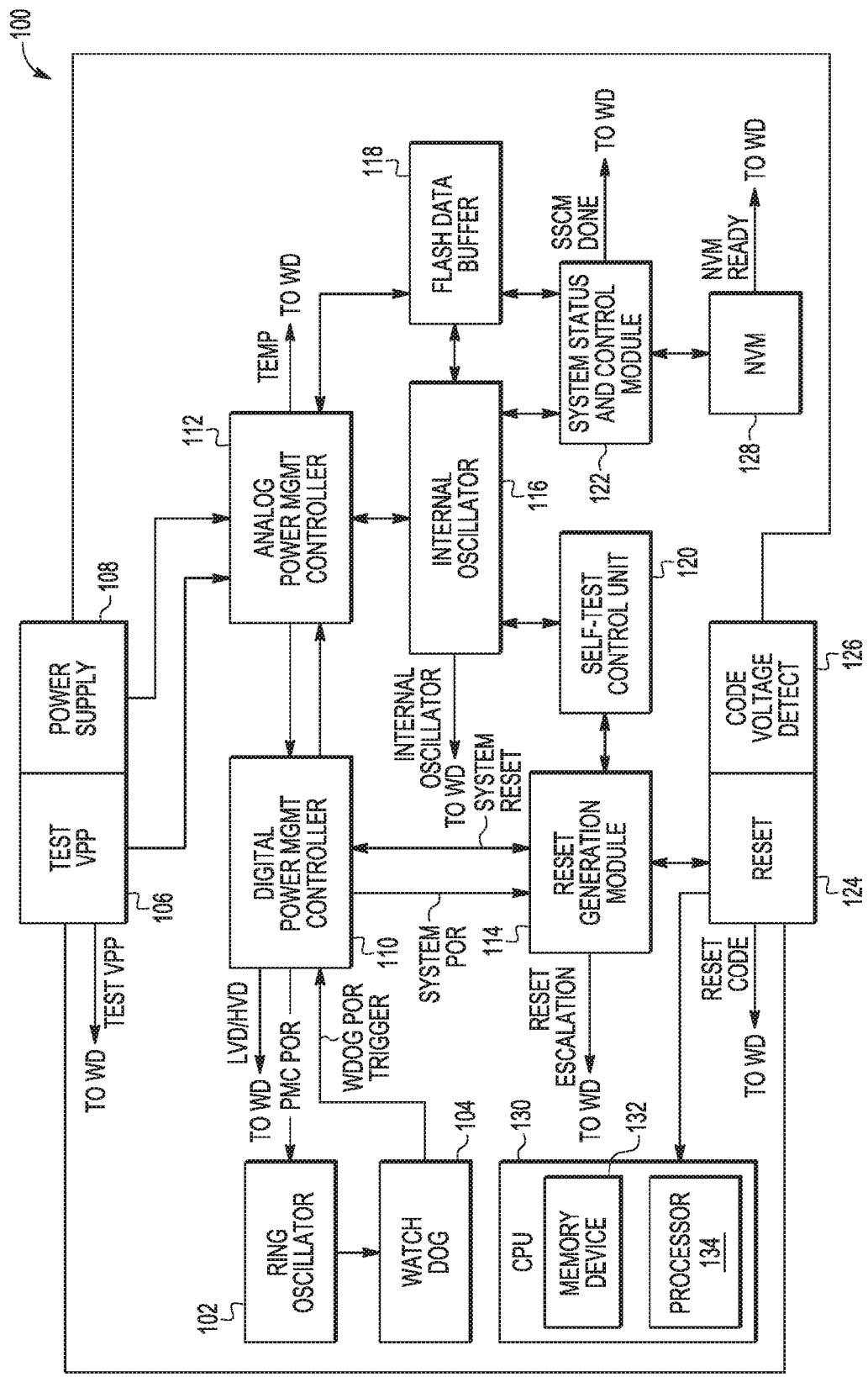
FIG. 1 illustrates a processing system in accordance with at least one embodiment of the present disclosure.

FIG. 1 shows a data processing system 100 in accordance with at least one embodiment of the present disclosure. The data processing system 100 includes one or more central processor units (CPU) 130 with one or more memory devices 132 and one or more processor cores 134, ring oscillator 102, watch dog unit 104, test mode pad 106, power supply pad 108, digital power management controller (DPMC) 110, analog power management controller (APMC) 112, reset generation unit 114, internal oscillator 116, flash data buffer 118, self-test control unit 120, system status and control unit (SSCM) 122, reset pin 124, core voltage detect unit 126, and non-volatile memory (NVM) 128. Processing system 100 can also include other components that are not shown such as, among others, an input/output unit, network interface logic, an internal bus to communicate between components within processing system 100 and an external bus to interface with peripherals outside of processing system 100.

Components in system 100 can be implemented using a general purpose processor, special purpose processors, state machines, and/or other types of logic circuits capable of performing logic operations. CPU 130 can communicate with other CPUs and memory devices, and can store data to or receive data from memory device 132. CPU 130 can also receive and send data packets from/to other devices via an input/output unit and a local or global information network.

Ring oscillator 102 generates a clock signal for watch dog unit 104 that is independent of a system or boot clock signal provided to other components in system 100 by internal oscillator 116. Ring oscillator 102 is triggered to start operation and provide an independent clock signal to watch dog unit 104 when a power on reset is triggered by the digital PMC 110.

Watch dog unit 104 receives various signals (also referred to as indications) from components in system 100 including a test program voltage (test VPP) signal from test mode pad 106, an LVD or HVD signal from DPMC 110, a temperature sensor signal from APMC 112, and diagnostic signals such as an internal clock OK signal from internal oscillator 116, a system status and control unit (SSCM) done signal from SSCM 122, non-volatile memory (NVM) ready signal from NVM 128, and a reset output buffer enable (OBE) signal from reset pin 124. The signals from various components are used by watch dog unit 104 when system 100 remains in reset after a specified amount of time to determine whether the reset signal is an error, or whether a legitimate reason exists to intentionally remain in reset. As an example, if the reset OBE signal is seen as disabled by watch dog unit 104, system 100 is remaining in reset intentionally. On the other hand, one or more of the on-chip signals such as the temperature sensor signal, SSCM done signal, LVD/HVD signals, NVM ready signal, and internal oscillator operational signal, may be incorrectly set if, for example, a trim level of voltage is not reached within an expected time period during power-on reset. If a reset signal is set due to a bad trimming sequence in a slow power ramp condition, watch dog unit 104 can re-initiate the power-on reset (POR) sequence by issuing a watch dog POR trigger signal to DPMC 110. If a predetermined number of the on-chip signals trigger back and forth in repeated loops, reset generation module 114 can provide a reset escalation signal to watch dog unit 104. The reset escalation signal can be read by watch dog unit 104 to determine whether the system should stay in reset.

DPMC 110 controls startup trim and voltage, enables LVD/HVD signals, and controls a self-test mode for system 100. When watch dog module 104 sends a watch dog POR trigger signal to DPMC 110, DPMC 110 can send a system POR signal to reset generation module 114. When reset generation module 114 sends a system reset signal to DPMC 110, a system reset can be send to CPU 130.

APMC 112 is coupled to access trim voltage signals from flash data buffer 118 and to receive a boot or system clock signal from internal oscillator 116 and a watch dog power-on reset (POR) trigger signal from watch dog unit 104 that indicates an unintentional stuck in reset condition.

Flash data buffer 118 loads trim data from NVM 128, determines the destination for the trim data, and send the trim data to a respective component such as analog PMC 112 or digital PMC 110 in system 100.

Self-test control unit 120 tests DPMC 110 and APMC 112 for manufacturing defects as part of the reset process and is coupled to communicate with reset generation unit 114 and internal oscillator 116.

Reset generation unit 114 receives a system power-on reset signal and LVD/HVD signals from digital power management controller 110 and provides a system reset signal to CPU 130. The system POR signal can be based on the watch dog POR trigger signal sent by watch dog unit 104 to digital power management controller 110. Reset generation unit 114 also receives input regarding PMC self-test from self-test control unit 120, and generates or asserts a reset escalation signal that is provided to watch dog unit 104.

System status and control unit 122 retrieves trim voltage data from NVM 128 and provides an SSCM done signal to watch dog unit 104 indicating whether a successful read of trim data from NVM 128 was performed. NVM 128 can be implemented as flash or other suitable type of memory on chip with other components of system 100, or off-chip in a standalone memory chip or other device. An NVM ready signal is provided from NVM 128 to watch dog unit 104 to indicate when the NVM 128 is initialized and operational.

Core voltage detect unit 126 is coupled to reset pin 124 and prevent reset pin 124 from being de-asserted or released until voltages reach trim level. Reset pin 124 is coupled to provide a reset output buffer enable signal to watch dog unit 104 and a reset signal to reset generation unit 114. Reset pin 124 can also receive a reset signal from an external component.

CPU 130 includes one or more memory devices 132 and one or more processors 134. CPU 130 can be found in many forms including but not limited to mainframes, minicomputers, servers, workstations, personal computers, notepads, personal digital assistants, electronic games, automotive and other embedded systems, cell phones, wearable devices, wireless devices, and various other devices. CPU 130 processes information according to built-in logic circuitry and/or one or more software programs and produces resultant output information that may be sent to one or more I/O devices. A program is a list of instructions such as a particular application program and/or an operating system. A computer process typically includes an executing (running) program or portion of a program, current program values and state information, and the resources used by the operating system to manage the execution of the process. A parent process may spawn other, child processes to help perform the overall functionality of the parent process.

Figure 2:
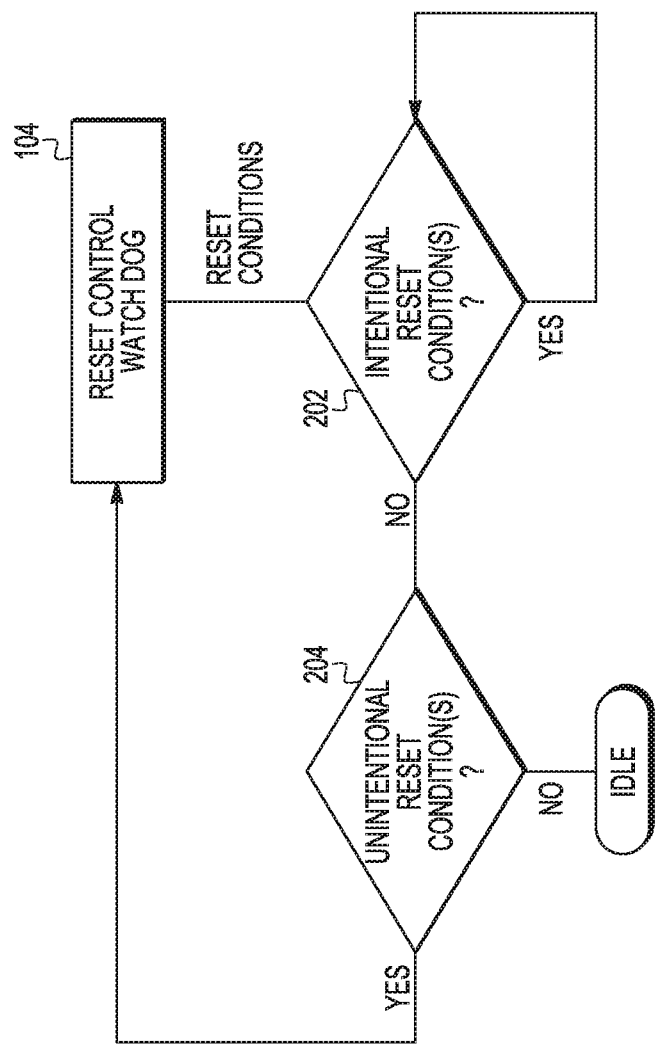
FIG. 2 illustrates a flow diagram of an embodiment of a method for managing power on reset using a watch dog in the processing system of FIG. 1.

FIG. 2 illustrates a flow diagram of an embodiment of a method 200 for managing power on reset using watch dog unit 104 in the processing system 100 of FIG. 1. In processes 202, watch dog unit 104 analyzes reset conditions or signals including on-chip signals such as the temperature sensor signal, SSCM done signal, LVD/HVD signals, NVM ready signal, reset escalation signal, and internal oscillator OK signal, as well as the reset OBE signal to determine whether an intentional reset condition exists. A reset condition can be considered intentional when the reset OBE signal is disabled, which indicates the Reset pin is held active by an external component, or a number of the on-chip signals are set. For example, if a predefined number of the on-chip signals such as the temperature sensor signal, SSCM done signal, LVD/HVD signals, NVM ready signal, and internal oscillator OK signal, repeatedly toggle, the reset escalation signal to watch dog unit 104 may be set to indicate that system 100 should intentionally remain in power on reset until the condition causing multiple on-chip signals to indicate the corresponding components are not ready to come out of reset is cleared. Alternatively, if reset pin is held low by an external component, the reset OBE signal will be seen as de-asserted or released, thus indicating the external system is holding the reset pin active. In this situation, watch dog unit 104 may also consider this an intentional reset condition. If the reset condition is determined to be intentional, process 202 continues monitoring the reset conditions until an intentional reset condition is no longer detected.

Once an intentional reset condition is no longer detected, process 204 determines whether an unintentional reset condition exists. A reset condition can be considered unintentional when the reset OBE signal is asserted and one of the internal signals, i.e. oscillator OK, LVD/HVD, SSCM done, and/or NVM ready signals, are seen active. If an unintentional reset condition exists, process 204 returns to watch dog unit 104 to generate a watch dog power on reset and re-start the watch dog reset counter, which generates a system POR from DPMC 110 to the entire system 100 via reset generation module 114 to restart the reset process.

If an unintentional reset condition does not exist, then process 204 determines that system 100 is not in power-on reset, thereby allowing system 100 to transition to an idle state.

Figure 3:
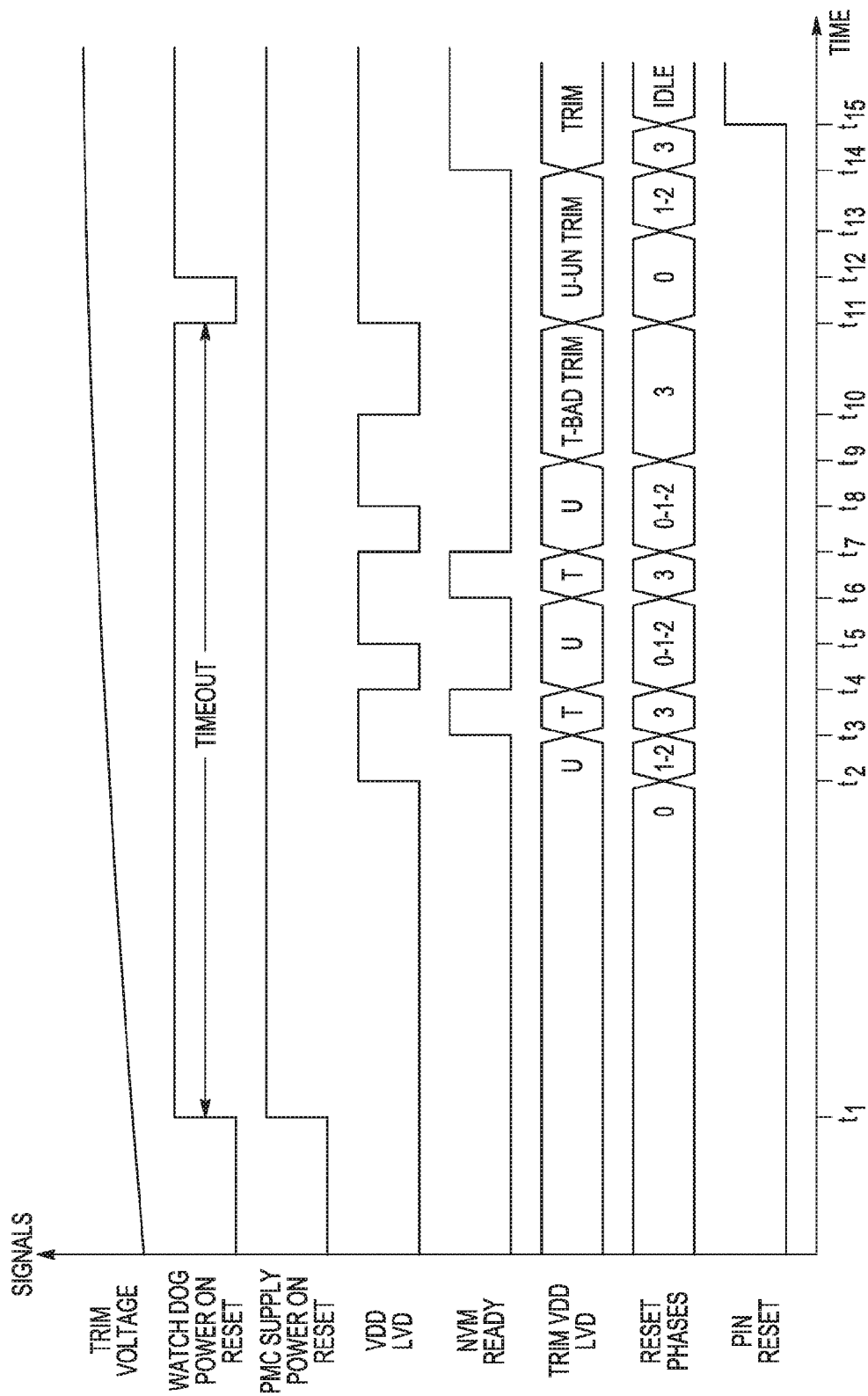
FIG. 3 illustrates an example of a reset timeline that can occur using the power on reset watch dog in the processing system of FIG. 1.

Referring to FIGS. 1 and 3, FIG. 3 illustrates an example of a reset timeline for various signals in system 100 that can occur using the power on reset watch dog 104 of FIG. 1. Between time t0 and t14, supply voltage is rising toward a minimum level desired for proper operation of components in or coupled to system 100, such as NVM 128 and internal oscillator 116. A slow ramp up on supply voltage affects the trim sequence and may cause bad trims to get latched from NVM 128, thus causing a permanent stuck in reset condition. Instead of getting stuck in reset, watch dog unit 104 allows intentional reset conditions to be distinguished from unintentional reset conditions so system 100 can transition from reset to another mode such as RUN under certain circumstances that would otherwise cause system 100 to remain in reset. By generating a watch dog POR signal, the stuck in reset condition ends and the sequence in FIG. 3 repeats from the beginning. The system deadlock under an unintentional stuck in reset condition is therefore overcome.

In the example shown, a timeout period for system power-on reset is shown from time t1 to time t11 and is measured using a pre-specified number of cycles of internal oscillator 116. A second timeout period starts at time t12. At time t1, digital power management controller 110 issues a power-on reset signal (PMC Reset), which enables watch dog unit 104 to start analyzing reset conditions. LVD signals for supply voltage VDD are asserted between time t1 and t4, time t5 and t7, time t8 and t10, and from time t11 to the end of the timeline shown. The LVD is cycling because the supply voltage is ramping too slowly. When trim data gets loaded, the supply level is not yet reached to the trim voltage levels thus causing the LVD signals to assert again. This process continues until the supply voltages goes higher than the trim voltage levels. During this cycling, bad trim data can get latched, which may cause the trim voltage to go higher than operational levels of the power supply causing a permanent stuck in reset. Watch dog module 104 will identify this as an unintentional condition and generate a WDOG POR after the time out period and recover the system.

NVM ready signal is asserted between time t3 and t4, between time t6 and t7, and from time t14 to the end of the timeline shown. Note that the NVM ready signal is asserted in each time period after the VDD LVD signal is asserted, and deasserted when the VDD LVD signal is deasserted, until trim voltage reaches a required level at time t9.

The trim VDD LVD timeline in FIG. 3 is shown with sections marked with "U" to represent that components in system 100 are untrimmed, and with "T" to indicate that valid trimmed data has been latched by power management controllers 110, 112. T-Bad trim indicates bad trim data is loaded due to repeated reset loops that can occur when stuck in reset. Trim data from NVM 128 is shown as untrim between time t0 and t3, valid trim between time t3 and t4, untrim between time t4 and t6, valid trim between time t6 and t7, untrim between time t7 and t9, bad trim between time t9 and t11 causing a permanent LVD signal assertion from t10 until watch dog module 104 issues power on reset at t11 to recover the system, untrim between time t11 and t14, and finally valid trim from time t14 to the end of the timeline shown indicating that valid trim data has been latched and used to trim respective components.

The power-on reset operation can be implemented in several stages or phases, with some phases being required to be completed before other phases can begin. For example, a first reset phase "0" can involve determining that a counter for internal oscillator 166 is operating correctly and a desired level of supply voltage VDD is available. A second reset phase "1" can involve determining internal oscillator 166 is operating correctly and NVM 128 is ready. A third reset phase "2" can involve determining trim data can be read for flash memory for LVD, HVD, oscillator 116, and other configuration parameters. A fourth reset phase "3" can involve latching the trim data from NVM 128 and applying the trim data in respective components.

An example of reset phases during reset of system 100 is shown in the timeline of FIG. 3 includes phase 0 between time t0 and t2, phases 1 and 2 between time t2 and t3, phase 3 between time t3 and t4, phases 0, 1 and 2 between time t4 and t6, phase 3 between time t6 and t7, phases 0, 1 and 2 between time t7 and t9, phase 3 between time t9 and t11, phase 0 between time t11 and t13, phases 1 and 2 between time t13 and t14, and phase 3 between time t14 and t15. Once phase 3 is complete at time t15, system 100 enters and idle state from time t15 to the end of the timeline shown and can subsequently transition to a RUN state for CPU 130. A reset signal is asserted to indicate system reset is complete at the same time system 100 enters the idle state. The watch dog unit 104 can then be deactivated until the next system reset signal is received. Note that the watch dog power-on reset trigger provided to digital PMC 110 can be used by digital PMC 110 to generate a system POR signal for reset generation module 114 to start the system reset process over if an unintentional reset condition is detected. Under intentional reset conditions, watch dog module 104 does not drive the watch dog POR trigger signal while system 100 remains in reset.

By now it should be appreciated that in some embodiments, there has been provided a method for managing reset in a processing system that can include enabling a watch dog unit (104) based on a power-on reset (POR) signal (output from 110), receiving a reset condition indication (LVD/HVD, reset OBE, IRC ok, test, Vpp pin, etc., at the watch dog unit; determining whether the received reset condition indication corresponds to an unintentional reset condition (e.g. diagnostics); and generating a watch dog POR trigger signal if the received reset condition indication is an indication of an unintentional reset condition (204).

In another aspect, the method can further comprise coupling a ring oscillator (102) to the watch dog unit, and determining whether the received reset condition indication corresponds to an unintentional reset condition occurs within a timeout period generated by a clock output signal from the ring oscillator.

In another aspect, a value of the timeout period can include a fixed period value and a programmable period value.

In another aspect, the method can further comprise coupling a power management controller (110, 112) to the watch dog unit, where the power management controller generates the POR signal. The watch dog POR trigger signal from the watch dog unit can be received at an input of the power management controller, and the power management controller can generate a system POR based on the watch dog POR trigger signal.

In another aspect, the watch dog POR trigger signal can provide an indication of the unintentional reset condition.

In another aspect, the method can further comprise determining whether the received reset condition indication corresponds to an intentional reset condition (202).

In another aspect, an intentional reset condition can be determined by monitoring a reset input/output pin (124, reset OBE control signal).

In another aspect, a watch dog power-on reset is not generated during a received indication of an intentional reset condition (202 yes).

In another aspect, the unintentional reset condition can be generated by a diagnostic test failure.

In other selected embodiments, a method for managing reset in a processing system can include enabling a watch dog unit (104) based on a power-on reset (POR) signal; receiving a reset condition indication at the watch dog unit; determining whether the received reset condition indication corresponds to an unintentional reset condition; generating a watch dog POR trigger signal if the received reset condition indication is an indication of an unintentional reset condition; and receiving the watch dog POR trigger signal at an input of a power management controller (110, 112). The power management controller can generate a system POR signal based on the watch dog POR trigger signal.

In another aspect, the method can further comprise coupling a ring oscillator (102) to the watch dog unit, the ring oscillator providing a clock signal to the watch dog unit; and generating a timeout period based on the clock signal. Determining whether the received reset condition indication corresponds to an unintentional reset condition can occur within the timeout period.

In another aspect, a value of the timeout period can include a programmable period value.

In another aspect, the power management controller (110, 112) generates the POR event based on a signal from a low voltage detection (LVD) circuit.

In another aspect, the method can further comprise determining whether the received reset condition indication corresponds to an intentional reset condition (202).

In another aspect, an intentional reset condition can be determined by monitoring an output buffer enable signal of reset input/output pin (reset OBE).

In another aspect, the POR signal may not be generated during a received indication of an intentional reset condition (202 yes).

In another aspect, the unintentional reset condition can be generated by a self-test failure.

In other selected embodiments, a processing system can comprise a watch dog unit (104) having an input to receive a reset condition signal and an output to provide a watch dog POR trigger signal indicative of a received reset condition signal corresponding to an unintentional reset condition. A power management controller (PMC) (110, 112) can be coupled to the watch dog unit to enable the watch dog unit based on a POR event. A reset generation unit (114) can generate a system reset signal based on the received watch dog POR trigger signal.

In another aspect, the power management controller can disable the watch dog unit upon entering a normal operating mode of the processing system. The power management controller can re-enable the watch dog unit based on any reset event occurring during the normal operating mode of the processing system.

In another aspect, a ring oscillator (102) can be coupled to provide a clock source to the watch dog unit to generate a timeout period.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Peripheral and I/O circuitry may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for managing reset in a processing system, the method comprising:
   enabling a watch dog unit based on a power-on reset (POR) signal;
   receiving a reset condition indication at the watch dog unit;
   determining whether the received reset condition indication corresponds to an unintentional reset condition; and
   generating a watch dog POR trigger signal if the received reset condition indication is an indication of an unintentional reset condition.

2. The method of claim 1, further comprising coupling a ring oscillator to the watch dog unit, and wherein the determining occurs within a timeout period generated by a clock output signal from the ring oscillator.

3. The method of claim 2, wherein a value of the timeout period includes a fixed period value and a programmable period value.

4. The method of claim 1, further comprising:
coupling a power management controller to the watch dog unit, the power management controller generating the POR signal; and
receiving at an input of the power management controller, the watch dog POR trigger signal from the watch dog unit, the power management controller generating a system POR signal based on the watch dog POR trigger signal.

5. The method of claim 4, wherein the watch dog POR trigger signal provides an indication of the unintentional reset condition.

6. The method of claim 1, further comprising determining whether the received reset condition indication corresponds to an intentional reset condition.

7. The method of claim 6, wherein an intentional reset condition is determined by monitoring a reset input/output pin.

8. The method of claim 7, wherein a watch dog power-on reset is not generated during a received indication of an intentional reset condition.

9. The method of claim 1, wherein the unintentional reset condition is generated by a diagnostic test failure.

10. A method for managing reset in a processing system, the method comprising:
enabling a watch dog unit based on a power-on reset (POR) signal;
receiving a reset condition indication at the watch dog unit;
determining whether the received reset condition indication corresponds to an unintentional reset condition;
generating a watch dog POR trigger signal if the received reset condition indication is an indication of an unintentional reset condition; and
receiving the watch dog POR trigger signal at an input of a power management controller, the power management controller generating a system reset based on the watch dog POR trigger signal.

11. The method of claim 10, further comprising:
coupling a ring oscillator to the watch dog unit, the ring oscillator providing a clock signal to the watch dog unit; and
generating a timeout period based on the clock signal, the determining occurring within the timeout period.

12. The method of claim 11, wherein a value of the timeout period includes a programmable period value.

13. The method of claim 10, wherein the power management controller generates the POR event based on a signal from a low voltage detection (LVD) circuit.

14. The method of claim 10, further comprising determining whether the received reset condition indication corresponds to an intentional reset condition.

15. The method of claim 14, wherein an intentional reset condition is determined by monitoring an output buffer enable signal of reset input/output pin.

16. The method of claim 15, wherein the POR signal is not generated during a received indication of an intentional reset condition.

17. The method of claim 16, wherein the unintentional reset condition is generated by a self-test failure.

18. A processing system, comprising:
a watch dog unit having an input to receive a reset condition signal and an output to provide a watch dog power-on reset (POR) trigger signal indicative of a received reset condition signal corresponding to an unintentional reset condition;
a power management controller (PMC) coupled to the watch dog unit, the power management controller enabling the watch dog unit based on a POR event; and
a reset generation unit to generate a system reset signal based on the received watch dog POR trigger signal.

19. The system of claim 18, wherein the power management controller disables the watch dog unit upon entering a normal operating mode of the processing system, and wherein the power management controller re-enables the watch dog unit based on any reset event occurring during the normal operating mode of the processing system.

20. The system of claim 18, further comprising a ring oscillator coupled to provide a clock source to the watch dog unit, the clock source used to generate a timeout period.

* * * * *